J. A. BERST.
ATTACHMENT FOR CAMERAS.
APPLICATION FILED NOV. 12, 1912.
1,117,159.
Patented Nov. 17, 1914.
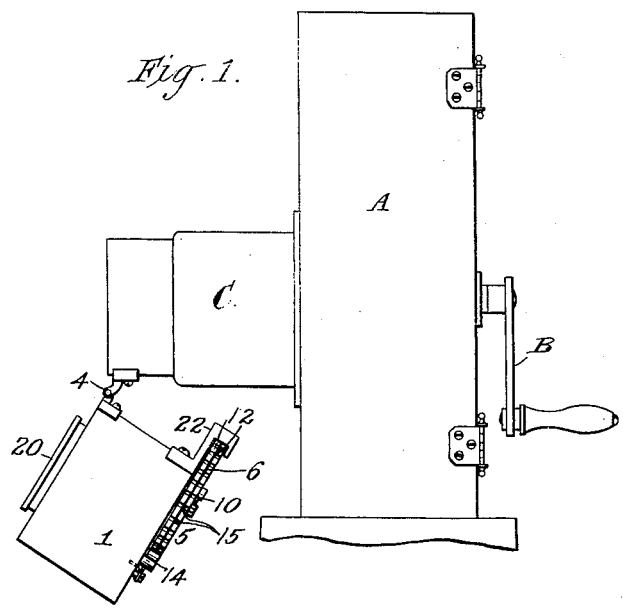
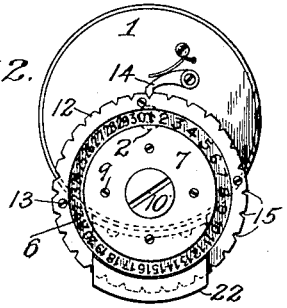
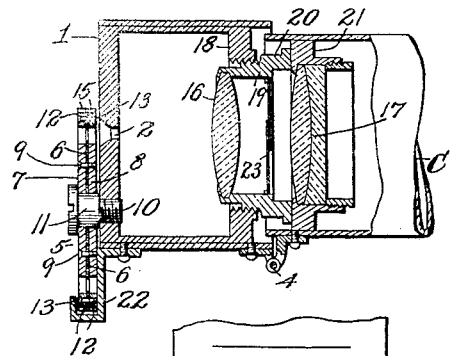
Witnesses:
W. H. Kennedy
O. F. Kehoe
Inventor:
Jacques A. Berst
by his Att'ys
Philipp Sawyer Rice Kennedy

UNITED STATES PATENT OFFICE.

JACQUES A. BERST, OF NEW YORK, N. Y.

ATTACHMENT FOR CAMERAS.

1,117,159.   Specification of Letters Patent.   Patented Nov. 17, 1914.

Application filed November 12, 1912. Serial No. 730,895.

*To all whom it may concern:*

Be it known that I, JACQUES A. BERST, a citizen of the Republic of France, residing at New York city, county of New York, and State of New York, have invented certain new and useful Improvements in Attachments for Cameras, fully described and represented in the following specification and the accompanying drawings, forming a part of the same.

This invention relates to improvements in devices for photographically producing identification marks on sensitive surfaces, and particularly relates to an improved attachment for detachable connection with a camera, whereby a desired identification mark can be photographed on a sensitive surface in the camera.

In accordance with the invention the attachment includes a mark carrier supported preferably through pivotal connections on the lens barrel of the camera so that it may be readily swung into photographic relation with the camera to permit an identifying mark on the carrier to be photographed on the sensitive surface of a plate or film in the camera, and, after the mark has been so photographed, swung out of photographic relation with the camera.

The mark carrier is preferably provided with a plurality of identifying marks, which may be words, letters, numerals or other symbols, and is supported so that any of these marks may be used as desired, either successively or otherwise.

In the annexed description, which will now be given in connection with the accompanying drawings, the attachment has been shown and will be described as used with the "taking" machine, or camera, used in producing moving pictures, and in which the sensitive surface is in the form of a strip of film.

In the drawings—Figure 1 is a side view of a camera such as is used for taking moving pictures, the attachment being shown in non-operative position; Fig. 2 is a front view of the device, showing the mark carrier; Fig. 3 is a section on an enlarged scale, showing the construction of the device and its relation to the lens barrel of the camera in operative position; Fig. 4 is a view on an enlarged scale of a portion of the mark carrier; and Fig. 5 is a face view of a portion of a moving picture film with the identifying mark photographed thereon.

Referring now to these drawings, the camera A is shown as provided with the conventional operating handle B and a lens barrel C.

A suitable and convenient form of the device or attachment, as shown, comprises a support 1 which, in the preferred construction, is in the form of a circular casing, and is provided at its front end with a light-aperture 2. This casing is arranged to be brought into photographic relation with the camera with which it is to be used. This may be effected in various ways. A simple and efficient way is in attaching the casing to the lens barrel of the camera so that it may be swung toward and away from such lens barrel. In the particular construction illustrated, the casing 1 is hinged to the lens barrel C by a hinge 4, so that it may be dropped or swung down away from the lens barrel and out of photographic relation with the camera, as shown in Fig. 1. Mounted on this casing is a mark carrier indicated generally by the numeral 5. The construction of this mark carrier may be widely varied, and the manner of mounting it on the casing may also be widely varied. Preferably the carrier is in the form of a transparent disk of celluloid or other suitable light transparent material 6, with the identifying marks which are to be photographed printed thereupon. This disk may be supported in any suitable manner. The disk will be provided with a plurality of identification marks which, in the present instance, are numbers, and in order that any one of these marks may be photographed on the sensitive surface, either successively or otherwise, as desired, the disk is mounted so as to be rotatable. A convenient construction is that shown in which the disk is held between two disks or plates 7, 8, the parts being secured together by small screws 9. These plates and the disk are rotatably secured to the support by a screw stud 10 having an enlarged bearing portion 11 on which the carrier can rotate. The edge of the mark carrier 5 exteriorly of the marks thereon is notched and on each side thereof provided with a notched flange 12 extending around the edge and secured thereto by small screws 13. The disk and plates forming the mark carrier are secured in the casing 1 below the center thereof, so that the numerals or other marks on the disk come in line with the aperture 2 in the casing before referred to. On the casing 1 is a spring pressed finger 14 adapted to coöperate with notches 15 in the disk 6 and flange 12, this construction acting to hold the carrier in the desired position opposite the aperture 2.

The attachment is preferably provided with a lens 16 which is so arranged relatively to the camera lens 17 that when the device is in operative position the desired mark will be photographed on the film through both lenses. This construction is adopted so that it is unnecessary to focus the camera for the identification mark and then refocus it for the picture which is to be taken, which would be exceedingly inconvenient. The lens 16 is mounted in the attachment in any suitable manner so as to be in suitable relation with the lens 17 of the camera. As shown, the casing 1 has at its rear end a depending threaded flange 18 into which is screwed a short lens barrel or frame 19 in which the lens 16 is mounted, this barrel 19 being provided with a flange 20 which, when the device is in operative position as shown in Fig. 3, abuts a flange 21 in the barrel C in which is mounted the lens 17 of the camera. A diaphragm 23 of usual construction may, if desired, be employed to sharpen the image of the mark to be photographed.

A guard 22 suitably secured to the casing 1 is or may be provided which forms a convenient hold for the hand of the operator, and prevents the hand from coming in contact with the mark carrier.

The operation of the device is obvious: When the operator is ready to take a subject the attachment is swung up by hand and held in the position shown in Fig. 3, the handle B of the machine being manipulated. The mark is then photographed a sufficient number of times on the strip of film, as illustrated in Fig. 5. The operator then removes his hand, and the attachment falls by its own weight to the position shown in Fig. 1, when the operator proceeds to take the subject. This means of identifying sensitive surfaces, as will be apparent, is exceedingly convenient. It is desirable especially in the case of moving picture films, where, in many instances, to determine what a subject is, a considerable length of the film must be unwound before it can be determined what subject is presented on the film. The use of the present device in conjunction with a suitable list made at the time the picture was taken permits a ready identification of the subject and necessitates only the observation of one end of the film.

While the invention has been shown as embodied in a simple and efficient construction, and in connection with a moving picture camera, it will be understood that it is not limited to such construction nor to such use, but that various changes can be made in the construction without departing from the invention.

What is claimed is:—

1. An attachment for cameras for producing an indentifying mark on the senitive surface of the film in the camera, comprising a casing adapted to be brought into photographic relation with the camera, a lens carried in the casing, and a mark carrier having identification marks thereon mounted on the casing in advance of the lens.

2. An attachment for cameras for producing an identification mark on the sensitive surface of the film in the camera, comprising a casing pivotally connected with the camera and adapted to be swung into photographic relation therewith, a lens carried in the casing, and a mark carrier having identification marks thereon mounted on the casing in advance of the lens.

3. An attachment for cameras for producing identification marks on the sensitive surface of the film in the camera, comprising a casing adapted to be brought into photographic relation with the camera, a lens carried in the casing, and a mark carrier of transparent material having a plurality of identification marks formed thereon movably mounted on the casing in advance of the lens whereby any one of the marks on the carrier may be brought into photographic relation with the lens.

4. An attachment for cameras for producing identification marks on the sensitive surface of the film in the camera, comprising a casing adapted to be brought into photographic relation with the camera, a lens carried in the casing, a mark carrier of transparent material having a plurality of identification marks formed thereon movably mounted on the casing in advance of the lens whereby any one of the marks on the carrier may be brought into photographic relation with the lens, and means for locking the carrier in position.

5. An attachment for cameras for producing identifying marks on the sensitive surface of the film in the camera, comprising a casing pivotally connected to the camera so as to normally drop out of photographic relation therewith, a lens carried in the casing, and a mark carrier having identification marks thereon mounted on the casing in advance of the lens.

6. The combination with a photographic camera, of a casing secured to the camera and movable to and from photographic relation therewith, a lens carried in the casing, and a mark carrier having identifying marks carried by the casing in advance of the lens whereby the mark may be photographed on a sensitive surface in the camera.

7. The combination with a photographic camera provided with a lens barrel, of a casing hinged to the lens barrel so as to normally drop away from photographic relation with the barrel, a lens carried in the casing, and a mark carrier having identification marks thereon carried by the casing in advance of the lens whereby the mark may be photographed on the sensitive surface of the film in the camera.

8. The combination with a photographic camera, of means for photographically producing an identifying mark on the sensitive surface in the camera, said means being so supported as to drop by gravity out of photographic relation with the camera.

In testimony whereof, I have hereunto set my hand in the presence of two subscribing witnesses.

JACQUES A. BERST.

Witnesses:
H. C. HOAGLAND,
W. F. HURST.

---

Correction in Letters Patent No. 1,117,159.

It is hereby certified that in Letters Patent No. 1,117,159, granted November 17, 1914, upon the application of Jacques A. Berst, of New York, N. Y., for an improvement in "Attachments for Cameras," an error appears in the printed specification requiring correction as follows: Page 2, after line 8, insert the syllable and words *tion with the desired identification mark;* and that the said Letters Patent should be read with this correction therein that the same may conform to the record of the case in the Patent Office.

Signed and sealed this 8th day of December, A. D., 1914.

[SEAL.]
J. T. NEWTON,
*Acting Commissioner of Patents.*